US007987571B2

(12) United States Patent
English

(10) Patent No.: US 7,987,571 B2
(45) Date of Patent: Aug. 2, 2011

(54) TOOL FOR PULLING MIXING VALVE CARTRIDGE CORE AND SLEEVE AND METHOD OF USE

(76) Inventor: Richard Le Roy English, Anaheim, CA (US)

( * ) Notice: Subject to any disclaimer, the term of this patent is extended or adjusted under 35 U.S.C. 154(b) by 1086 days.

(21) Appl. No.: 11/729,014

(22) Filed: Mar. 29, 2007

(65) Prior Publication Data

US 2008/0235930 A1 Oct. 2, 2008

(51) Int. Cl.
*B23P 19/04* (2006.01)

(52) U.S. Cl. ............................... 29/264; 29/256; 29/282

(58) Field of Classification Search .................... 29/263, 29/264, 282, 426.5, 214, 217, 221.6, 256; 81/459

See application file for complete search history.

(56) References Cited

U.S. PATENT DOCUMENTS

| | | | | |
|---|---|---|---|---|
| 3,096,574 | A * | 7/1963 | Hillberg | 29/263 |
| 3,181,396 | A * | 5/1965 | Nance | 81/445 |
| 3,952,394 | A * | 4/1976 | Seminario | 29/263 |
| 5,119,556 | A | 6/1992 | Hseu | |
| 6,929,024 | B1 | 8/2005 | Rucker | |
| 2006/0043661 | A1 * | 3/2006 | Nardozza | 269/166 |

* cited by examiner

*Primary Examiner* — Lee D Wilson
*Assistant Examiner* — Jamal Daniel

(57) ABSTRACT

A system for removing single handle cartridges from housings of faucets and showers comprised of a core puller and a sleeve puller. The core and the sleeve of the cartridge are pulled in two separate steps. The core is pulled by attaching the core puller to the stem of the core with the open end of the core puller placed against the faucet/shower housing. The T-handle of the core puller is turned pulling the core out of the sleeve of the cartridge. The sleeve of the cartridge is then loosened using the sleeve puller which is expansively attached to the sleeve and twisted left and right sharply until the sleeve rotates inside the housing. The sleeve is then pulled by attaching the core puller to the outer end of the sleeve puller and turning the T-handle of the core puller to pull the sleeve puller and sleeve from the housing.

5 Claims, 6 Drawing Sheets

TOOL FOR PULLING MIXING VALVE CARTRIDGE CORE AND SLEEVE AND METHOD OF USE

BACKGROUND OF THE INVENTION

1. Field of the Invention

This invention relates to cartridge pullers, in particular to pullers of spool valves which comprise cartridge cores and sleeves and more specifically to pullers of Moen type single handle mixing valve cartridges used in showers and faucets, and a method of use thereof.

2. Description of Prior Art

Showers and faucets are often fitted with single handle mixing valves which serve to regulate the temperature and flow of water. These valves are commonly referred to as cartridges and fall into the general classification of spool valves which regulate flow and mixture of fluids by use of a slidable and/or rotatable core fitted inside a sleeve. The core and sleeve generally contain apertures through which the fluids flow. The core of the single handle mixing valve contains a thread for the attachment of a handle used to operate the valve. There are several types of single handle mixing valves and one of the most commonly used is manufactured by Moen Incorporated.

The Moen cartridge has been on the market for many years and is now manufactured by other companies as well. All of the cartridges manufactured to the Moen single handle mixing valve design are generally referred to as Moen cartridges. In the Moen cartridge, water flow is controlled by moving the core in and out of the sleeve, and temperature is controlled by twisting the core clockwise or counterclockwise. The cartridge is installed in a brass housing located in the body of a faucet or behind the wall of a shower. After installation, a handle is attached to the core to regulate water flow and temperature.

Moen cartridges are generally durable and last for many years before replacement is required. During the active life of the cartridge, mineral sediment builds up between the outer wall and O-rings of the cartridge and the inner wall of the brass housing. The sediment creates a rigid bond which freezes the cartridge inside the housing. Removing, or pulling, an old cartridge which is frozen inside a housing is an exceedingly difficult job. No simple and effective tool exists to pull frozen cartridges. One of the key objectives of the present invention is the easy and efficient removal of a Moen cartridge from a plumbing housing even in cases where the cartridge is frozen inside the housing.

There are a number of tools considered to be cartridge pullers which are actually designed to pull the core only. The user is often alarmed when the core comes out and leaves the sleeve frozen inside the housing. Without the use of a well designed sleeve puller, a frozen sleeve is impossible for a do-it-yourselfer or handyman to remove. This is especially critical in the case of a shower valve where the water to the dwelling cannot be turned back on until the cartridge is replaced. Some do-it-yourselfers and handymen have resorted to breaking through the shower wall to replace the housing itself. More commonly, a plumber is called for an emergency visit to fix the problem.

A tool frequently used to pull a cartridge is one which is supplied by Moen. This tool is a core puller but is often sold as a cartridge puller. The Moen core puller has a cylindrical body with indexing tabs at one end and a T-handle at the opposite end. The indexing tabs serve to center the tool on the housing and locate it against the opposite tabs on the end of the cartridge. A bolt down the centerline of the cylindrical body engages the thread in the core and a large nut threadably attached to the outside of the body presses against the rim of the housing. The T-handle is held stationary and a large wrench is used to advance the nut against the rim of the housing. Sometimes, the entire cartridge is pulled out, but more often just the core is pulled out. This tool is an effective core puller, but can not pull the complete cartridge when the sleeve is frozen inside the housing.

Rucker, U.S. Pat. No. 6,929,024 discloses a secondary tool to be added to the Moen tool for pulling the sleeve. Rucker discloses a large custom-design tap which is attached to the end of the Moen tool and used to cut threads into the wall of the sleeve. The tapping process is unfamiliar to most do-it-yourselfers and is difficult to perform. The tapping process also has the problem of creating metal shreds which could easily pass through the holes in the sides of the sleeve and lodge between the sleeve and housing. These metal shreds are likely to cause damage to the wall of the housing during the pulling process.

Frozen sleeves generally require a twisting motion to break up the rigid sediment between the sleeve and the wall of the housing. Sharp left-and-right twisting is much superior to direct outward pulling for the removal of the sleeve. The Moen tool with the added tap by Rucker does not have the capability of applying strong left-and-right twisting forces to the sleeve. In the case of a moderately frozen sleeve, pulling hard with this tool will probably strip the threads and leave the sleeve frozen inside the housing. The Rucker sleeve pulling tool is expensive, requires mechanical skills, may cause damage to the housing, and is subject to failure.

A tool for pulling both core and sleeve is disclosed by Hseu, U.S. Pat. No. 5,119,556. The Hseu tool uses a cylinder slidably engaged on a threaded rod. A flat handle is threaded onto the rod above the cylinder. On the rod below the cylinder is a thin oval washer and below the washer is a stop which is threaded on near the bottom end of the rod to retain the washer. Below the stop is a thread which engages the thread in the core. The tool is attached to the core and the cylinder is placed against the rim of the housing. The threaded handle is advanced along the rod and presses on the cylinder to create a pulling force on the core. To operate this tool, the cylinder must be held against the rim of the housing, the handle must be turned and the threaded rod must be held to prevent it from turning. The operation of the Hseu tool is awkward and requires significant dexterity.

Once the core is removed, the handle and cylinder are removed from the rod and a second tool with a biased magnet to hold the oval washer at an angle is slid onto the rod. This tool is used to push the washer into the sleeve and move it up and down until the washer flatly engages under an internal ledge within the sleeve. The biased magnet is removed and the flat handle and cylinder are reassembled to the rod. Pulling force is then applied as before by holding the cylinder, turning the handle and holding the threaded rod so that it does not turn. In most cases, the strength of this tool will not be sufficient to pull the sleeve. Most likely, the threads on the tool will strip or the oval washer will fail and release the tool. As explained above, frozen sleeves usually require twisting forces to break them free. Direct outward pulling is generally not enough to dislodge a frozen sleeve and often results in a broken tool or damaged plumbing. The Hseu tool can not provide twisting forces. Without this capability, the Hseu tool is not a complete solution to the removal of a Moen cartridge. Furthermore, the Hseu tool is complicated, weak and unreliable.

The tool disclosed by Seminario, U.S. Pat. No. 3,952,394, is a better tool for cartridge pulling, but it suffers from a number of problems which are solved by the present invention. Seminario shows a core pulling device which is difficult to use. Seminario suggests that the core be removed by a "relative rotation of the (threaded) rod and the bar" of the tool. This is difficult to accomplish because a cylinder must be held in contact with the rim of the housing and the threaded rod must be prevented from turning while the bar is rotated. This is an awkward operation and is similar to the Hseu tool.

The present invention which consists of a core puller, a sleeve puller and a handle, greatly simplifies the process of pulling a core by using a novel and unique combination left-hand/right-hand thread design on the core puller. A left-hand screw with a smaller right-hand screw attached at the leading end and a handle attached at the following end is threaded through the core puller body. Then the right-hand screw is threaded into the right-hand thread in the core. The handle is turned clockwise so that the left-hand screw moves outwardly from the core puller body and at the same time, the right-hand screw tightens into the core. This pulls the core outwardly from the sleeve and continued turning of the handle removes the core completely.

The right-hand/left-hand thread design is additionally unique in that it allows the screw to attach rigidly to both the core puller and to the core itself. The resultant rigid coupling between the core puller and the core automatically aligns, centers and supports the core puller on the housing. Turning the handle with one hand is all that is required to remove the core. Both the Hseu and Seminario tools require the operator to hold a sleeve against the rim of the housing, keep a threaded rod from turning and turn a handle all at once in order to pull the core. This is a complicated three-hand procedure which is much inferior to the simple one-hand procedure of the present invention.

Once the core is removed, Seminario shows a method of removing the sleeve by gripping the inside of the sleeve with a tubular tool containing expansible knurled segments at one end. The tool is inserted into the frozen sleeve and a conical expander is drawn into the tool to force the knurled areas of the expansible segments into contact with the wall of the sleeve. Unfortunately, with his design only the very tips of the segments make contact with the wall. Seminario uses a tapered pressure ring at the ends of the segments in an attempt to gain more contact with the sleeve. However, the taper does not work as desired. The taper at the end of the tool matches the taper of the conical expander and does little more than securely press the very ends of the segments into the sleeve wall. The reason for this is that the segments are extremely stiff and will not flex with the pressure of the expander. The tool itself is made of hardened steel, the segments are curved circumferentially and the segments have a substantial wall thickness. These factors all make the segments extremely stiff lengthwise. The Seminario segments can not bend to permit the knurled grip to achieve full contact with the sleeve and the majority of the knurled surface has little or no contact with the wall. As a result, only limited twisting force may be applied to the Seminario tool before it slips. Although the Seminario sleeve puller is an improvement over the other prior art references described herein, it remains flawed because it lacks the gripping power needed to quickly and effectively free a frozen sleeve.

The problem of inadequate gripping power is overcome in the present invention by using expansible segments featuring two novel and unique innovations. First, the rigid expansible segments are made to be somewhat flexible. This is accomplished in the preferred embodiment by cutting a slot around the circumference of the segments and creating a flexible member on each segment. Second, the pressure ring against which the expander presses is recessed inside the end of the tool. The pressure ring is provided in the preferred embodiment by cutting a recessed step inside the end of the tool directly beneath the knurled grip. This allows the conical expander to exert a more uniform outwardly expansive pressure on the knurled areas of the segments. As a result of this more uniform outwardly expansive pressure, the flexible members on the segments bend and the knurl is pressed flatly against the sleeve.

These innovations provide approximately 10 times as much contact area between the knurl and the sleeve as does the Seminario tool. Since gripping power is directly proportional to the area of contact between the knurl and the sleeve, the present invention provides approximately 10 times as much gripping power as the Seminario tool.

Finally, it is noted here that even after a sleeve is broken free of the housing by applying sharp twisting forces, a significant percentage of sleeves remain extremely resistant to pulling. This is because the sleeve has four O-rings sealing it to the housing, and in most cases, these O-rings are frozen to the housing. Three of the O-rings are mounted perpendicular to the axis of the sleeve, referred to as the perpendicular O-rings, and one is at an oblique angle, referred to as the oblique O-ring. Twisting the sleeve breaks the oblique O-ring from the housing, but does not free the perpendicular O-rings. The sleeve rotates inside the perpendicular O-rings and they remain bonded to the housing. In these cases, a "final pull" is required to break the perpendicular O-rings from the housing.

Although the Seminario tool can apply twisting forces and break the sleeve and the oblique O-ring free from the housing, it does not have a separate provision for performing a final pull in cases where the perpendicular O-rings remain frozen. In these cases, it is up to the operator to pull with enough strength to break the perpendicular O-rings free. Many operators will not be able to do this manually and will need additional help or other tools to finish the job of pulling the sleeve. The Seminario tool is significantly deficient in that it does not provide for a final pull.

This deficiency is cured in the present invention by uniquely combining the tasks of the core puller and the sleeve puller by assembling the two separate elements of the cartridge puller into a combined tool to perform a strong final pull. This is accomplished by attaching the core puller to the end of the sleeve puller and pulling the sleeve puller and sleeve together in much the same manner as pulling a core. This task may be accomplished by a worker of average strength and skill.

It is estimated that about 10 percent of all Moen cartridges can be completely removed by pulling on the core and removing both the core and sleeve in one piece. In cases where the sleeve remains frozen inside the housing, the difficulty of removing the sleeve varies from moderate to severe. No existing tool provides a sure and simple method of removal in all cases.

Consequently, a need exists for a tool which is inexpensive, a tool which is safe and easy to use, a tool which removes both the core and the sleeve of the cartridge, a tool which is fast, a tool which can be used by do-it-yourselfers and a tool which works every time. The present invention accomplishes these objectives.

SUMMARY OF THE INVENTION

The present invention is a tool which is capable of pulling Moen cartridges quickly and easily by a worker of average strength and skill regardless of the age or condition of the cartridge. The tool provides both core pulling and sleeve pulling capabilities.

The core puller of the present invention features a novel and unique combination screw containing two screw diameters including a right-hand thread for threading into the core or into the sleeve puller and a left-hand thread for exerting pulling force on the core or on the sleeve puller.

The sleeve puller of the present invention features expansible knurled segments similar to the Seminario tool but is much improved to provide superior gripping strength on the sleeve. Innovative and unique improvements include flexible segments and a recessed pressure ring. The sleeve puller also features a left-hand thread for expanding the grip and securing the sleeve puller inside the sleeve and a right-hand threaded hole at the outer end for attaching the core puller whenever a final pull is required.

Because of the extreme difficulty of removing the Moen cartridge, any truly successful tool design must provide:

(1) a quick and easy method of removing the core without fail every time;

(2) an easy and reliable method of removing the sleeve in cases where the sleeve is not removed with the core;

(3) a tool which can perform a final pull in cases where O-rings are frozen to the housing;

(4) a simple tool that the handyman or homeowner can understand and operate; and (5) a very producible tool that the homeowner can easily afford.

The present invention satisfies all of these requirements.

OBJECTS AND ADVANTAGES

It is therefore an object of the present invention to provide a new and useful cartridge puller for Moen cartridges. Further objectives and advantages of the present invention are to provide:

(a) a cartridge puller consisting of a core puller, a sleeve puller and an interchangeable handle;

(b) a cartridge puller which is economical to manufacture;

(c) a cartridge puller which will pull a cartridge regardless of how firmly it is frozen inside the housing;

(d) a cartridge puller which inexperienced workers of average strength and skill may use easily and successfully;

(e) a cartridge puller which is durable enough for the professional and inexpensive enough for the handyman or homeowner;

(f) a cartridge puller which can perform a final pull in cases where O-rings are frozen to the housing;

(g) a cartridge puller which reduces the time and effort for the removal of cartridges and increases productivity;

(h) a cartridge puller which overcomes the limitations and disadvantages of cartridge pullers heretofore provided;

(i) a core puller which is self-centering on the housing and does not require additional tools to operate;

(j) a core puller which is easy to attach to the core and supports itself when so attached;

(k) a core puller which can be operated simply and quickly;

(l) a sleeve puller having an innovative gripping design which provides superior grip on the sleeve so that it can be twisted left-and-right vigorously to break the sleeve from the housing;

(m) a sleeve puller which has an external hex on its body for the attachment of a wrench to apply substantial, sharp twisting forces;

(n) a handle which features a novel and unique design allowing it to be exchanged between the core puller and the sleeve puller as needed;

(o) a handle which is slidably attached for greater convenience and leverage.

REFERENCE NUMBERS IN DRAWINGS

| | | | | | |
|---|---|---|---|---|---|
| 10 | handle | 12 | shaft | 14 | O-ring |
| 16 | groove | 20 | core puller | 22 | left-hand screw |
| 24 | right-hand screw | 26 | body | 28 | left-hand thread |
| 32 | cavity | 34 | combination screw | 36 | hole |
| 38 | core | 40 | snap ring | 42 | snap ring groove |
| 46 | sleeve | 47 | perpendicular O-ring | 48 | housing |
| 49 | oblique O-ring | 50 | sleeve puller | 52 | shaft |
| 53 | hole | 54 | external hex | 55 | right-hand thread |
| 56 | body | 60 | left-hand thread | 61 | left-hand screw |
| 62 | pressure ring | 63 | groove | 64 | conical expander |
| 66 | knurled grip | 68 | grip contact area | 70 | flexible member |
| 72 | slot | 74 | segment | 80 | cartridge |
| 81 | tube | 82 | bar | 83 | handle |
| 84 | screw | 85 | spacer element | 90 | prior art |
| 92 | segment | 93 | pressure ring | 94 | conical expander |
| 96 | grip contact area | 98 | knurled grip | | |

DETAILED DESCRIPTION OF THE PREFERRED EMBODIMENT

Figure 1:
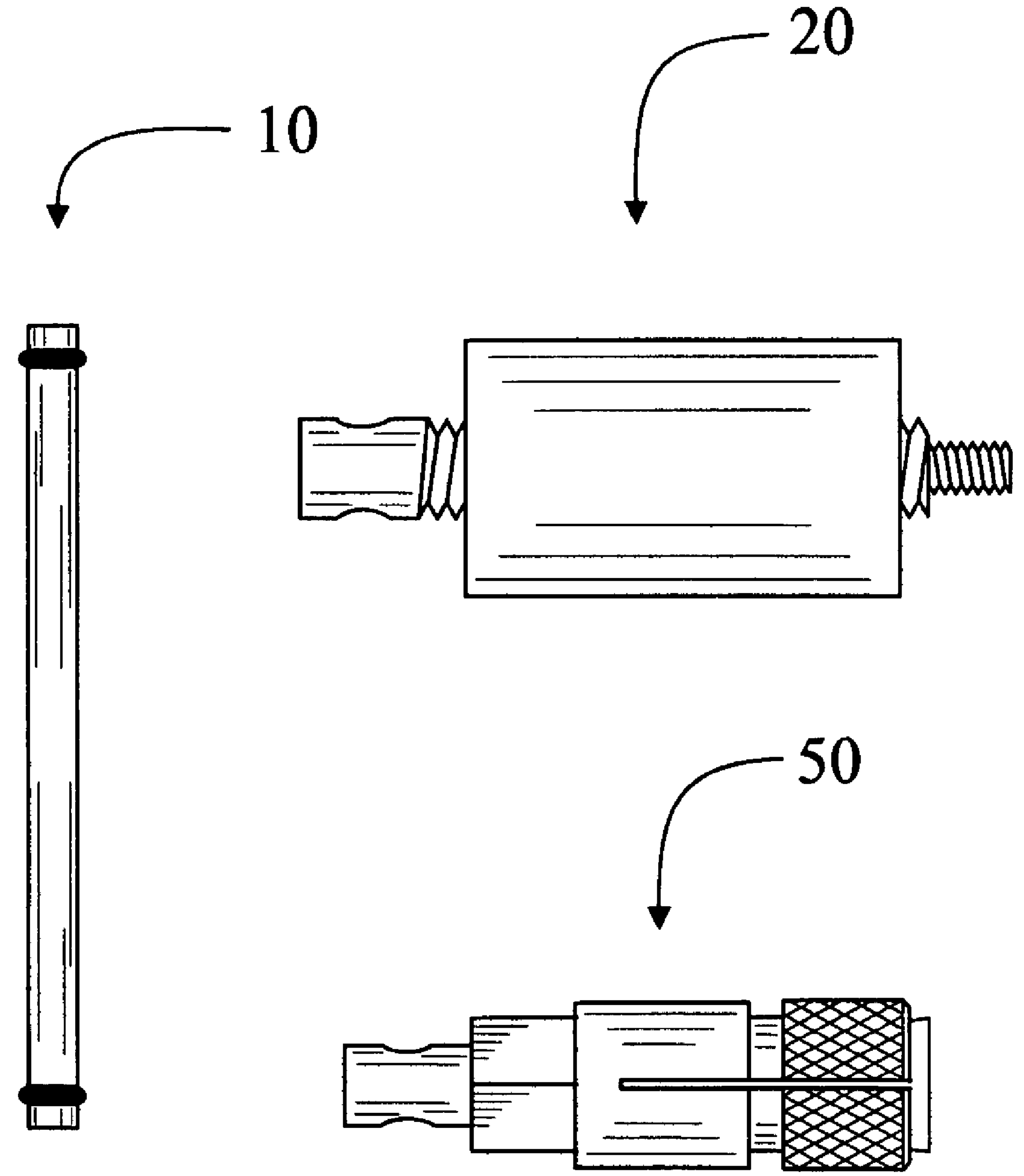
FIG. 1 shows the three major components of the cartridge puller tool consisting of a handle, a core puller, and a sleeve puller.

FIG. 1 shows the three components of the cartridge puller tool which are used in combination to perform the two tasks of core pulling and sleeve pulling required to pull a cartridge. Although the tool is shown as three components, they are designed to work interactively and interdependently to accomplish the single objective of pulling a cartridge. In that sense, the three components together make up a single tool. The tool components are handle 10, core puller 20, and sleeve puller 50. Handle 10 is designed to attach-and-detach quickly and easily to and from core puller 20 and sleeve puller 50 as needed to perform the cartridge pulling task.

Figure 2:
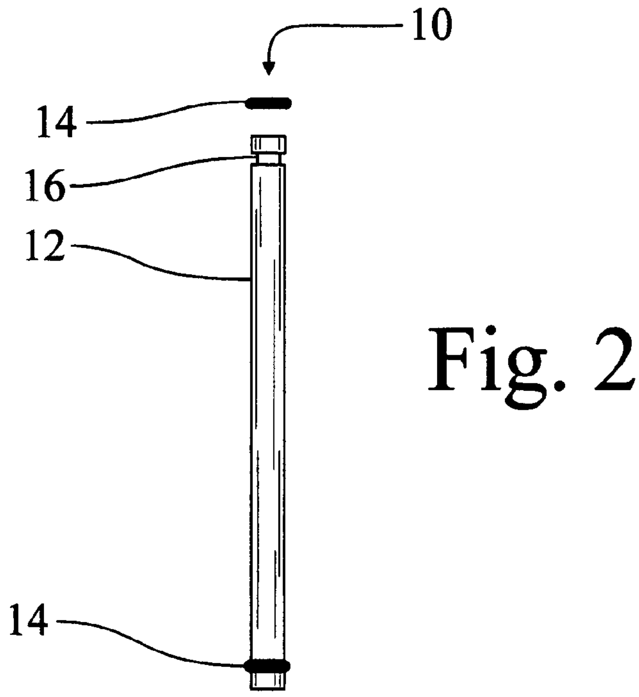
FIG. 2 shows the preferred embodiment of the interchangeable handle.

The preferred embodiment of handle 10 is shown in FIG. 2 and is composed of shaft 12 having grooves 16 at each end containing removable O-rings 14. Handle 10 possesses two novel and unique features which reduce cost and add to the overall usefulness of the tool. First, handle 10 is quickly detachable-and-attachable so it may be used by both core puller 20 and sleeve puller 50. Second, handle 10 can slide back-and-forth on the tool to provide better grip, leverage and access.

To make handle 10 easily detachable, grooves 16 are configured such that when O-ring 14 is seated in groove 16, the top half of O-ring 14 stands above the surface of shaft 12. As a result, O-ring 14 provides a very secure retainer for handle 10 and cannot be displaced even by pulling strongly on handle 10. At the same time, O-ring 14 is easily removed by rolling it off of shaft 12 with thumb pressure. This allows handle 10 to be moved quickly from core puller 20 to sleeve puller 50 and visa-versa.

Figure 5:
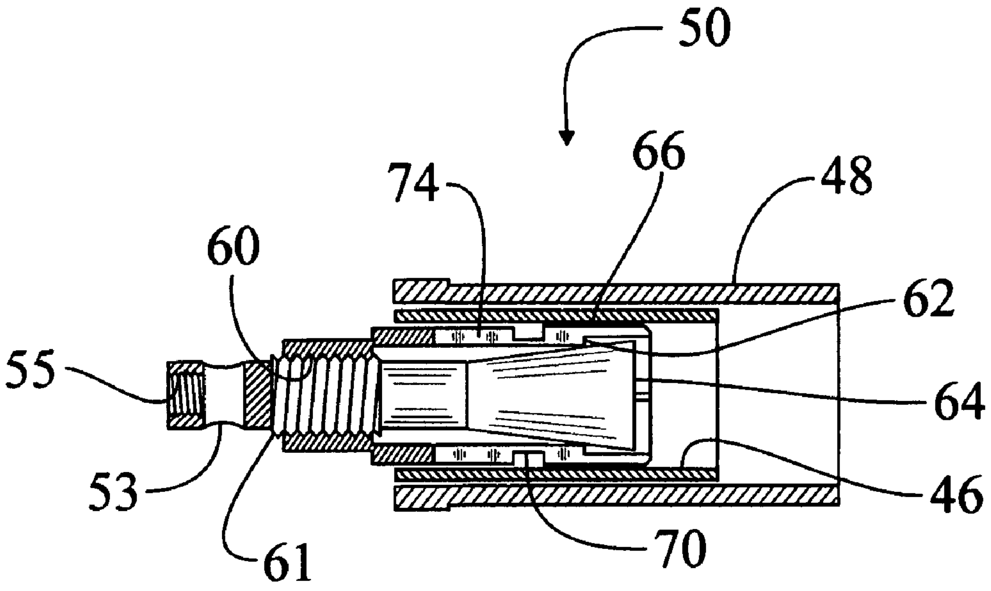
FIG. 5 shows the sleeve puller in partial section engaged with a sleeve. The handle is removed allowing easy access to the external hex and thread on the sleeve puller.
Figure 6:
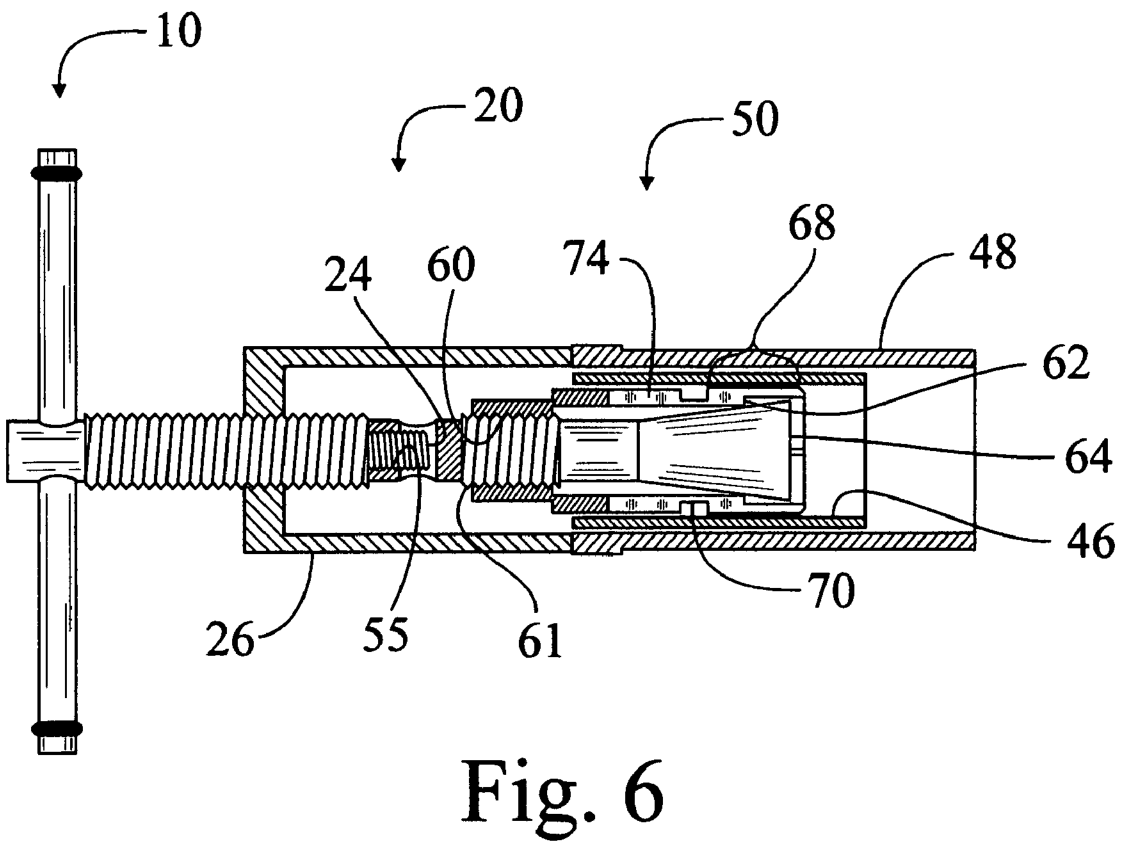
FIG. 6 shows the core puller attached to the sleeve puller in preparation for a final pull.

Removing handle 10 from the tool also allows better access to the tool shaft and body. This is important for sleeve puller 50 as shown in FIG. 6 where sleeve puller 50 is assembled together with core puller 20 to perform a final pull on a sleeve having frozen-in O-rings. Here it is shown that handle 10 must be removed from sleeve puller 50 to allow core puller 20 to be attached to right-hand thread 55. Also, FIG. 5 shows sleeve puller 50 with handle 10 removed so that a wrench, such as a box wrench, may be easily attached to external hex 54. The wrench is then used to twist sleeve puller 50 sharply left-and-right to break up sediment holding sleeve 46 inside housing 48.

The second feature of handle 10 is its ability to slide back-and-forth on the tool. The diameter of shaft 12 is slightly smaller than the diameter of transverse hole 36 of core puller 20 and transverse hole 53 of sleeve puller 50. Handle 10 is free to slide back-and-forth as the tool is used. This adds to the ease of use and effectiveness of the tool. For instance, it makes one-hand operation easier by sliding handle 10 to the right for right hand turning or to the left for left hand turning. In cases where clearance is restricted on one side, handle 10 easily slides out of the way to avoid interference. Also, the slidable handle 10 is easier for the operator to use from an anatomical point of view because it is easier to grip and turn a handle which is fully extended to one side than it is to grip and turn a handle which is in a fixed, centered position.

Figure 3:
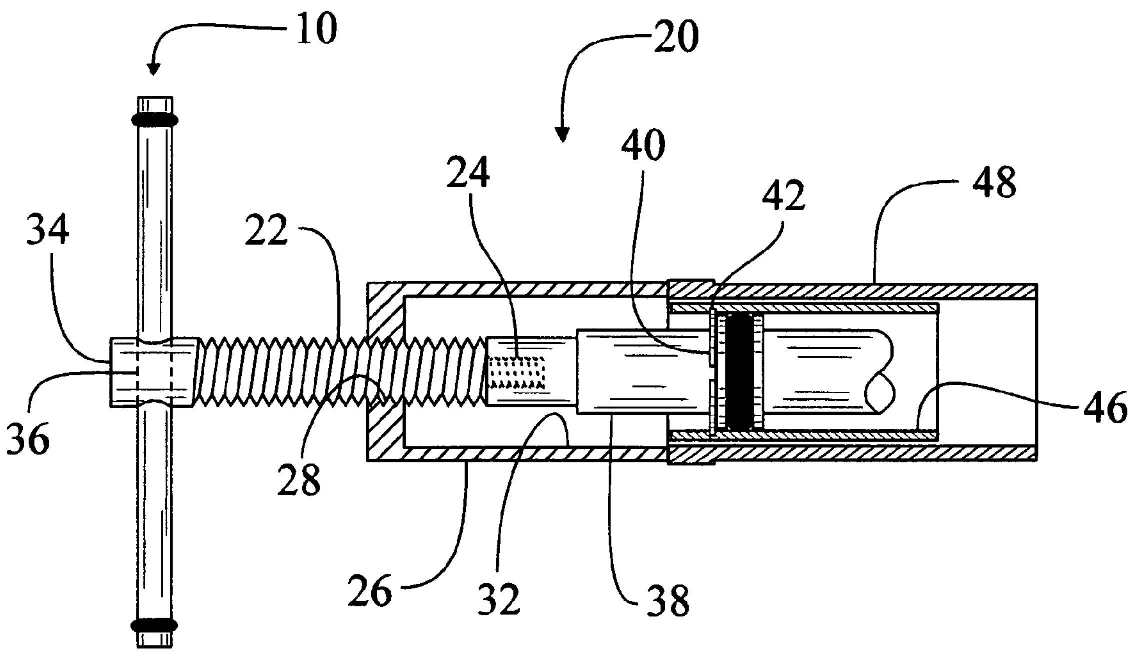
FIG. 3 shows the preferred embodiment of the core puller in partial section engaged with a core.

FIG. 3 shows the preferred embodiment of core puller 20 in partial section engaged with core 38. Core puller 20 is composed of generally cylindrical body 26, combination screw 34 and handle 10. Combination screw 34 contains transverse hole 36 at one end for slidably mounting handle 10, followed by left-hand screw 22 to engage left-hand thread 28 of body 26 followed by right-hand screw 24 to engage core 38.

It was found that core puller 20 automatically aligns, centers and supports itself on housing 48 when screw 24 engages core 38 because of the rigid attachment of screw 22 to body 26. Therefore, combination screw 34 not only serves as a means to pull core 38, but also serves to rigidly align, center and support core puller 20.

Once core puller 20 is attached to core 38 as shown in FIG. 3, turning handle 10 clockwise tightens right-hand screw 24 into core 38 and at the same time withdraws left-hand screw 22 out of body 26. Continued turning pulls core 38 out of housing 48 and into cavity 32. Core 38 turns freely inside sleeve 46 as it is drawn into cavity 32 and, if sleeve 46 is not frozen inside housing 48, sleeve 46 is drawn out along with core 38. The cartridge is then withdrawn from housing 48 by pulling handle 10. It was found that because core puller 20 is automatically aligned, centered and supported, removal of the core is a quick, simple, one-hand operation. Once screw 24 is attached to core 38 and body 26 is advanced along screw 22 to contact housing 48, turning handle 10 clockwise compresses body 26 against housing 48. This prevents body 26 from rotating as handle 10 is turned. Handle 10 may then be turned further by one hand to remove core 38.

Neither the Hseu nor Seminario core puller has an attachment which rigidly aligns, centers and supports their tool. The long cylindrical bodies of their tools must be held against the housing with one hand while turning a bar (Seminario) or a handle (Hseu) with the other hand to apply pulling pressure to the core. In addition, their designs require that the screw also be held from turning while the bar or handle is turned. Using their tools is an awkward three-hand operation. This problem is illustrated in FIG. 10 showing prior art 90 core puller.

Figure 10:
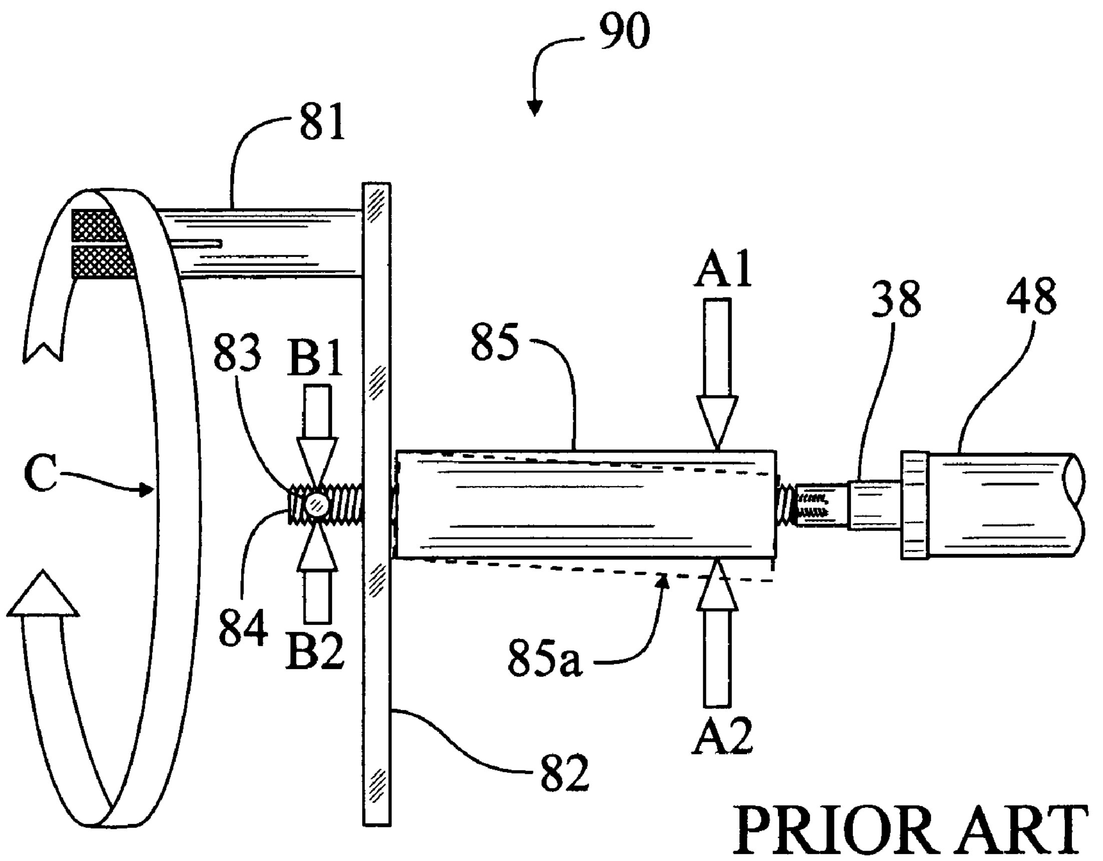
FIG. 10 shows the prior art core puller operation.

Specifically, FIG. 10 shows the mounting and pulling details of the Seminario core puller. The operation of the Hseu tool is similar. In FIG. 10, prior art 90 core puller is shown attached to core 38 but has not yet been tightened against housing 48. Spacer element 85 is slid loosely onto screw 84 and generally slumps into an off-center position as shown by the dotted outline 85*a*. As a result, spacer element 85 must be straightened by grasping the tube at positions A1 and A2 and sliding it toward housing 48 manually. At the same time, handle 83 must be gripped at positions B1 and B2 to keep screw 84 from turning while bar 82 is turned and advanced along screw 84. Bar 82 is turned by using tube 81 as a crank handle as shown by circular arrow C.

The tool is poorly designed from an anatomical point of view because the hand holding the screw at positions B1 and B2 gets in the way of the hand turning the crank so the operator must turn, let go, reach over to re-grasp the crank, turn, let go, and repeat. There is much turning, letting go, reaching over and re-grasping until the tool is tightened down. In the mean time, spacer element 85 must be constantly realigned so bar 82 can advance properly. This clumsy operation is significantly inferior to the simple one-hand operation of the present invention previously described. The operation of the Hseu tool is similarly awkward.

Referring back to FIG. 3, in cases where sleeve 46 is firmly frozen inside housing 48, pulling strongly on core 38 will cause core 38 to dislodge snap ring 40 from snap ring groove 42. Core 38 will then come out of sleeve 46 leaving sleeve 46 frozen inside housing 48. In practice, sleeve 46 is often left frozen inside housing 48. In these cases, sleeve 46 is removed using sleeve puller 50.

Figure 4:
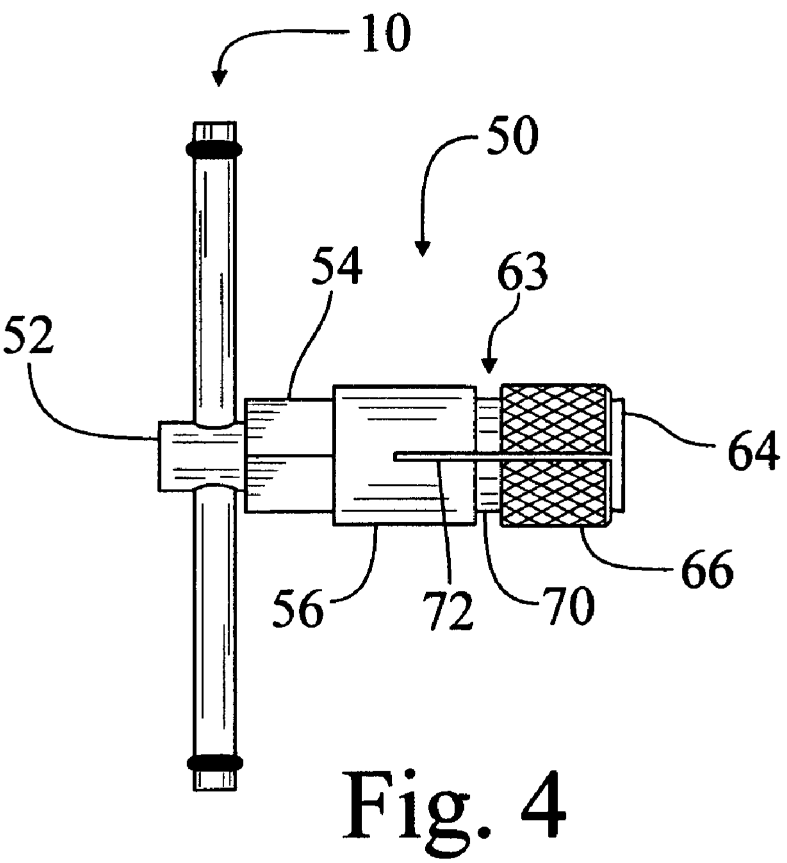
FIG. 4 shows the preferred embodiment of the sleeve puller.

The preferred embodiment of sleeve puller 50 is shown in FIGS. 4 and 5. Sleeve puller 50 is composed of generally tubular body 56, shaft 52 and handle 10. Shaft 52 has a centered hole at one end containing right-hand thread 55 to engage core puller 20 for a final pull, followed by transverse hole 53 for slidably mounting handle 10, followed by left-hand screw 61 to engage left-hand thread 60 of body 56, followed by conical expander 64 at the opposite end to provide pressure against pressure ring 62. Body 56 has external hex 54 at one end for attaching a wrench and knurled grip 66 at the opposite end for gripping the wall of sleeve 46. Lengthwise slots 72 are cut at intervals around body 56 dividing the circumference of body 56 into segments 74. A recessed step is cut inside body 56 at a position located under knurled grip 66 to provide pressure ring 62. Slots 72 are cut with enough length to allow knurled grip 66 to expand outwardly when conical expander 64 is pulled against pressure ring 62.

It is an object of this invention that knurled grip 66 contact flatly against the wall of sleeve 46 in order to provide the maximum gripping power. Generally, segments 74 are extremely stiff due to their curvature, hardness and thickness. As a result, a flexing means must be added so that segments 74 bend with the application of moderate forces on pressure ring 62. Such a flexing means for segments 74 is provided by adding one or more grooves 63 around the exterior circumference of body 56 adjacent to knurled grip 66 and at other positions along segments 74 as needed. Groove 63 functions to weaken the walls of segments 74 and create flexible members 70 along the length of segments 74. This allows segments 74 to bend when outwardly expansive pressure is applied to pressure ring 62.

FIG. 5 shows a cross-sectional view of sleeve puller 50 mounted inside sleeve 46 in preparation for loosening and removing sleeve 46 from housing 48. As conical expander 64 is tightened, pressure ring 62 is expanded outwardly which forces flexible members 70 to bend and allow knurled grip 66 to be pressed into full, flat contact against the inner surface of sleeve 46. Recessed pressure ring 62 and flexible segments 74 containing flexible members 70 are design innovations which provide approximately 10 times as much grip contact area as does prior art 90 sleeve puller.

Figure 8:
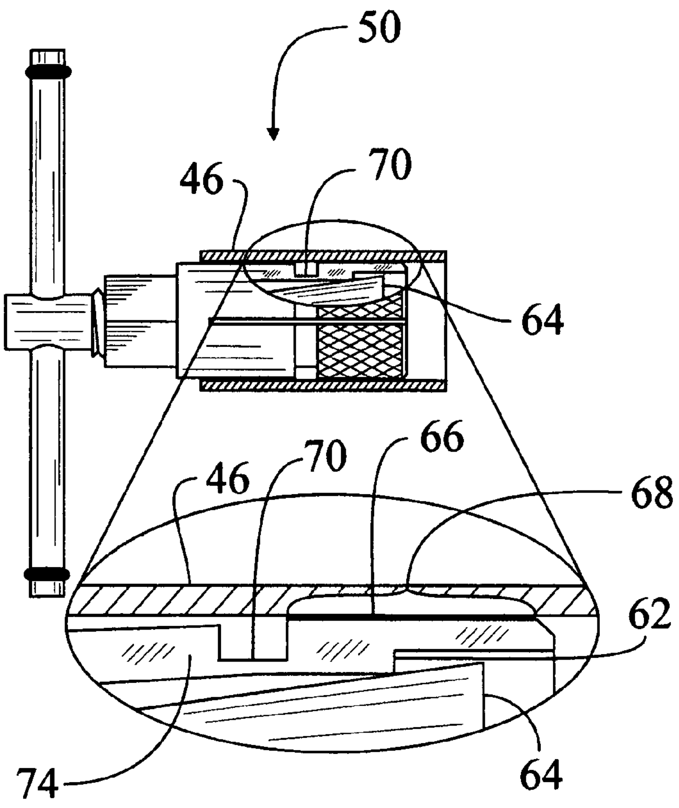
FIG. 8 shows an enlarged cross-sectional view of the sleeve puller engaged with a sleeve.
Figure 9:
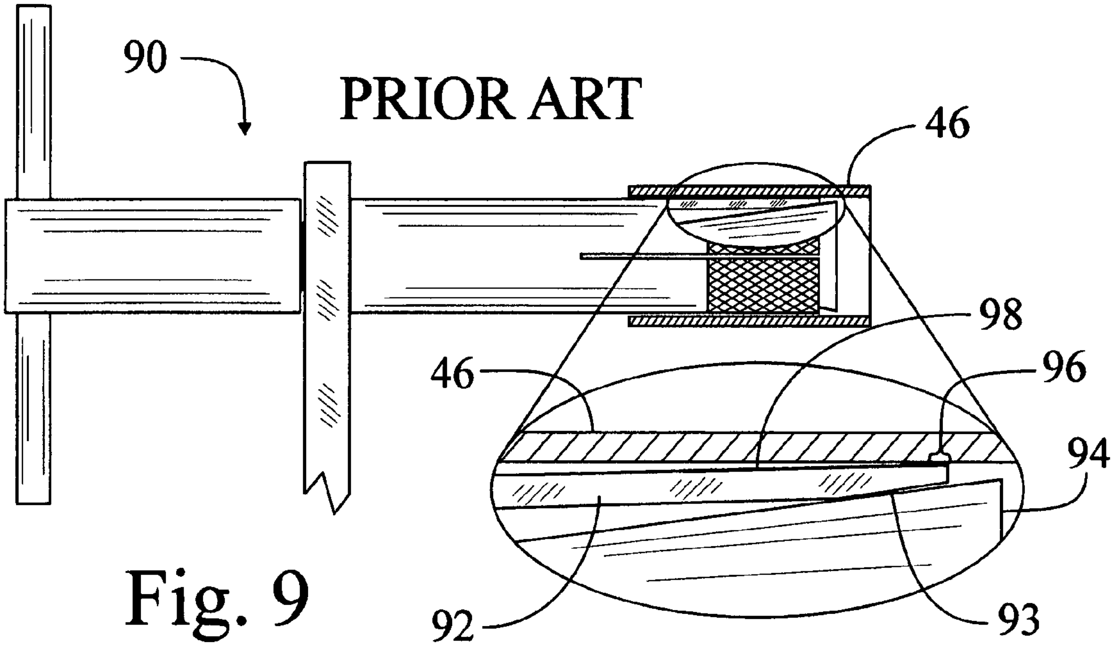
FIG. 9 shows an enlarged cross-sectional view of a prior art sleeve puller engaged with a sleeve.

To illustrate this increased grip contact area, FIGS. 8 and 9 show enlarged cross-sectional views of the present invention sleeve puller 50 and prior art 90 sleeve puller as they would look when mounted inside sleeve 46 and fully tightened to grip sleeve 46. The enlarged section of FIG. 8 shows knurled grip 66 of the present invention in contact with sleeve 46 as it would be when conical expander 64 is fully tightened against recessed pressure ring 62. Flexible member 70 is bent and allows knurled grip 66 to press into full contact with the wall of sleeve 46 resulting in full grip contact area 68.

FIG. 9 shows prior art 90 sleeve puller with conical expander 94 fully tightened against pressure ring 93 and pressing segments 92 into contact with sleeve 46. Pressure ring 93 is tapered and is located at the very end of segments 92. Seminario indicates that the taper is intended to increase the contact area between knurled grip 98 and the wall of sleeve 46. In fact, the taper does not work as desired and results in strong contact at the very tips of segments 92 and little or no contact for the rest of knurled grip 98. Tapered pressure ring 93 is ineffective because segments 92 are extremely stiff and refuse to bend and allow knurled grip 98 to contact sleeve 46 flatly. As discussed earlier, segments 92 are inflexible because they are curved around their circumference, they are made of hardened steel and they are relatively thick. The Seminario tool does not have a flexing means on segments 92 necessary to achieve flat contact with sleeve 46. As a result, tapered pressure ring 93 separates from conical expander 94 as shown in FIG. 9 and only the tips of segments 92 contact the wall of sleeve 46. The fractional grip contact area 96 of prior art 90 sleeve puller provides only about 10 percent of the gripping power of the full grip contact area 68 of the present invention sleeve puller 50.

OPERATION

The following describes the steps in using the cartridge puller to remove a cartridge which is firmly frozen inside a housing.

Core puller 20 is attached to core 38 by screw 24 centering body 26 automatically on housing 48 as shown in FIG. 3. Handle 10 is turned clockwise to press body 26 against housing 48 and withdraw core 38 from sleeve 46. Sleeve puller 50 is then used to remove sleeve 46.

Sleeve puller 50 is shown in FIG. 4 with handle 10 attached as it would be for insertion into a frozen sleeve. Sleeve puller 50 is inserted into sleeve 46 and handle 10 is turned clockwise to draw conical expander 64 into body 56 and against pressure ring 62. Continued turning of handle 10 forces knurled grip 66 into strong, flat contact with sleeve 46 as shown in FIG. 5. If desired, handle 10 may be removed as shown in FIG. 5 to provide easier access to external hex 54. A wrench is then attached to external hex 54 and sleeve puller 50 is twisted left-and-right sharply and repeatedly to crumble the mineral sediment between sleeve 46 and housing 48.

Figure 7:
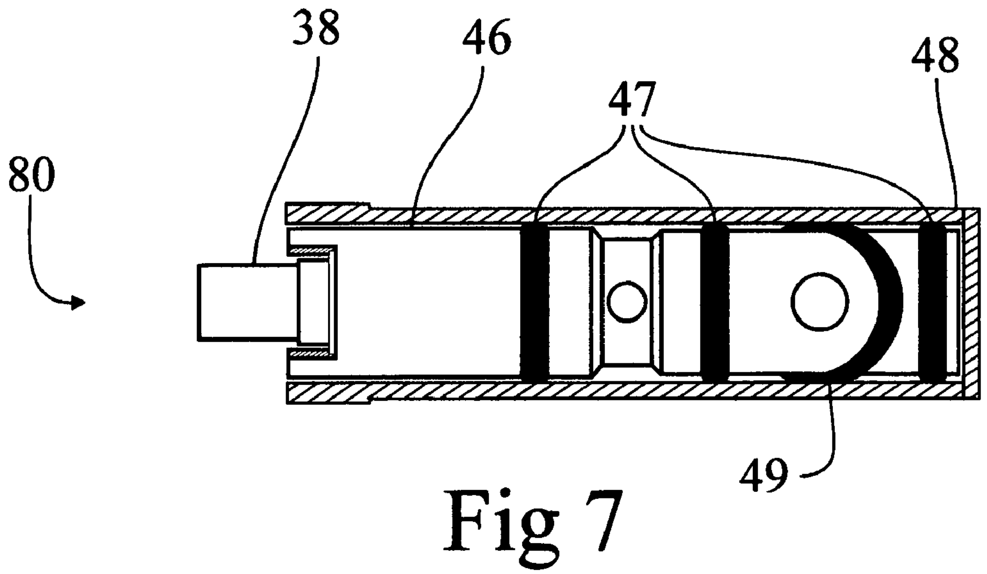
FIG. 7 shows a cartridge inside a housing.

In some cases, sleeve 46 may then be withdrawn from housing 48. In other cases, sleeve 46 remains stuck inside housing 48 even though sleeve 46 turns freely inside housing 46. The reason for this is shown in FIG. 7 where cartridge 80 is shown to have three perpendicular O-rings 47 and one oblique O-ring 49. Twisting sleeve 46 frees it and oblique O-ring 49 from housing 48, but it does not free the three perpendicular O-rings 47. As noted before, this happens because sleeve 46 rotates inside perpendicular O-rings 47.

In cases where perpendicular O-rings 47 remain frozen to housing 48, it is still very difficult to remove sleeve 46. Perpendicular O-rings 47 must be broken free by pulling strongly on sleeve 46. In these cases, a final pull is accomplished by attaching right-hand screw 24 of core puller 20 to right-hand thread 55 of sleeve puller 50 as shown in FIG. 6. As was the case in pulling core 38, attachment of core puller 20 to sleeve puller 50 aligns, centers and supports core puller 20 on housing 48. Sleeve puller 50 and sleeve 46 are then pulled out much as core 38 was in a previous step. Handle 10 is turned clockwise which tightens right-hand screw 24 of core puller 20 into right-hand thread 55 of sleeve puller 50 and at the same time tightens conical expander 64 against pressure ring 62. Continued turning pulls sleeve puller 50 and sleeve 46 completely out of housing 48.

It is clear that the unique combination of tool components consisting of handle 10, core puller 20 and sleeve puller 50 which are used in combination to preform all the tasks required for cartridge removal is a novel and complete solution to the extremely difficult job of pulling frozen cartridges. This unique cartridge puller quickly and easily pulls cores and sleeves by allowing the operator to combine tool components as needed to remove cores, loosen sleeves and do a final pull.

CONCLUSIONS, RAMIFICATIONS AND SCOPE

From the foregoing description it is seen that the present invention provides a very simple, efficient, low cost and reliable method of removing cartridges from housings.

While in the foregoing there has been set forth the preferred embodiment of the invention, it will be appreciated that the details herein given may be varied by those skilled in the art without departing from the true spirit and scope of the appended claims.

Thus the scope of the invention should be determined by the appended claims and their legal equivalents, rather than the examples given.

I claim:

1. A system for pulling spool valve cartridge cores and sleeves from plumbing housings, said system comprising in combination a handle, a core puller and a sleeve puller;
- said handle comprising:
  - a rod with removable retainer means at one end or both ends;
- said core puller comprising:
  - a cylindrical body having a first end and a second end;
  - a cylindrical cavity at said first end of said cylindrical body, said cavity having an inner diameter configured to accept said core during pulling;
  - a centered left-hand threaded hole at said second end of said cylindrical body, said hole configured to accept an advancing screw;
  - a left-hand threaded screw having a first end and a second end, said screw passing through said centered left-hand threaded hole at said second end of said cylindrical body such that said first end of said screw advances into said cavity of said cylindrical body and longitudinally through said cylindrical body;

a smaller diameter right-hand threaded screw at said first end of said left-hand threaded screw to engage said core or said sleeve puller;

a transverse hole at said second end of said left-hand threaded screw for slidably attaching said handle to apply turning force to said screw;

said sleeve puller comprising:

a cylindrical tube having a first end and a second end;

an expansible member at said first end of said cylindrical tube;

a centered left-hand threaded hole and an external hex at said second end of said cylindrical tube;

a shaft having a first end, a center section and a second end passing through said centered left-hand threaded hole at said second end of said cylindrical tube such that said first end of said shaft passes into said cylindrical tube and longitudinally through said cylindrical tube;

an expander at said first end of said shaft;

a left-handed thread on said center section of said shaft engaging said centered left-hand threaded hole at said second end of said cylindrical tube;

a transverse hole at said second end of said shaft for slidably attaching said handle to apply turning force to said shaft;

a right-hand threaded axially extending hole at said second end of said shaft of said sleeve puller configured to accept said smaller diameter right-hand screw at said first end of said core puller.

2. The system of claim 1 wherein said removable retainer means on said handle is selected from the following group:

a groove around the circumference of said rod containing an O-ring;

a slide-on retainer;

a press-on retainer;

a screw-on retainer;

a clip-on retainer.

3. The system of claim 1 wherein: said expansible member at said first end of said cylindrical tube of said sleeve puller comprises:

a circumferential knurled area at said first end of said cylindrical tube;

a recessed step inside said first end of said cylindrical tube creating a single stepped pressure ring located beneath the mid point of said knurled area at said first end of said cylindrical tube against which said expander applies outwardly expansive pressure; said recessed pressure ring being located beneath said knurled area;

longitudinal slots slots parallel to the axis of said cylindrical tube at said first end of said cylindrical tube dividing said cylindrical tube into longitudinal segments which expand outwardly upon engagement of said expander with said pressure ring, said segments extending past said knurled area.

4. The system of claim 1 wherein: said expansible member of said sleeve puller further comprises flexible portions of said segments selected from the following group:

at least one a groove cut around the outer circumference of said segments to increase flexibility;

a general thinning of the walls of said segments;

a narrowing of the width of said segments;

an increase in the number of said segments of said flexible portion.

5. The system of claim 1 wherein: said expander at said first end of said shaft of said sleeve puller comprises a cone with its largest diameter at the extreme end of said first end of said shaft;

said largest diameter of said cone being smaller than the inner diameter of said first end of said cylindrical tube and larger than the inner diameter of said pressure ring such that as said shaft is turned by said handle, said cone is drawn forcefully into contact with said pressure ring exerting outwardly expansive pressure on said segments and forcing said knurled area into contact with said sleeve, and with further turning of said handle, said outwardly expansive pressure increases and said flexible portions of said segments yield to said pressure and said knurled area is pressed into full, flat contact with said sleeve.

* * * * *